United States Patent
Lee et al.

(10) Patent No.: US 8,414,017 B2
(45) Date of Patent: Apr. 9, 2013

(54) ROOF AIRBAG APPARATUS FOR VEHICLE

(75) Inventors: Chang Hyun Lee, Yongin-si (KR); Hyeong Ho Choi, Gwangmyeong-si (KR); Sang Min Jo, Hwaseong-si (KR); Un Koo Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 38 days.

(21) Appl. No.: 13/165,136

(22) Filed: Jun. 21, 2011

(65) Prior Publication Data
US 2012/0119473 A1 May 17, 2012

(30) Foreign Application Priority Data
Nov. 11, 2010 (KR) .......................... 10-2010-0112114

(51) Int. Cl.
*B60R 21/213* (2006.01)
*B60R 21/231* (2006.01)

(52) U.S. Cl. ................ 280/730.1; 280/743.2; 280/743.1

(58) Field of Classification Search ................ 280/730.1, 280/729, 743.1, 743.2, 749
See application file for complete search history.

(56) References Cited

U.S. PATENT DOCUMENTS

| 3,664,682 | A | * | 5/1972 | Campbell ................ 280/730.1 |
| 3,774,936 | A | * | 11/1973 | Barnett et al. ............ 280/730.1 |
| 3,836,168 | A | * | 9/1974 | Nonaka et al. ............... 280/733 |
| 3,897,961 | A | * | 8/1975 | Leising et al. ............ 280/730.1 |
| 5,470,103 | A | * | 11/1995 | Vaillancourt et al. ...... 280/730.1 |
| 6,722,691 | B1 | * | 4/2004 | Håland et al. ............. 280/730.1 |
| 7,806,432 | B2 | * | 10/2010 | Nelson et al. ............. 280/730.2 |
| 2005/0023806 | A1 | * | 2/2005 | Higuchi .................... 280/730.1 |
| 2009/0295131 | A1 | * | 12/2009 | Kim ........................... 280/730.1 |
| 2010/0237594 | A1 | * | 9/2010 | Hirth et al. ................ 280/730.1 |
| 2012/0080869 | A1 | * | 4/2012 | Lee et al. ...................... 280/729 |

FOREIGN PATENT DOCUMENTS

DE 102 56 024 A1 * 6/2004
KR 10-2007-0042093 A 4/2007

* cited by examiner

*Primary Examiner* — Ruth Ilan
(74) *Attorney, Agent, or Firm* — Morgan, Lewis & Bockius LLP

(57) ABSTRACT

A roof airbag apparatus for a vehicle, may include an inflator providing gas pressure, an air tube deploying towards sides of a passenger sitting on a seat when gas may be supplied from the inflator into the air tube, and a front support panel provided on a front end of the air tube to enclose a front portion of the passenger when the air tube may be deployed.

13 Claims, 8 Drawing Sheets

ROOF AIRBAG APPARATUS FOR VEHICLE

CROSS-REFERENCE TO RELATED APPLICATIONS

The present application claims priority to Korean Patent Application No. 10-2010-0112114 filed on Nov. 11, 2010, the entire contents of which is incorporated herein for purposes by this reference.

BACKGROUND OF THE INVENTION

1. Field of the Invention

The present invention relates generally to roof airbag apparatuses for vehicles and, more particularly, to a roof airbag apparatus for a vehicle which is configured such that even though an air tube which is deployed from a roof panel of the vehicle has a comparatively small volume, it can effectively protect a passenger in the event of a vehicle collision.

2. Description of Related Art

Generally, airbag apparatuses protect the upper bodies of passengers in such a way that the airbag cushions are rapidly inflated by injecting air or gas into airbag cushions when vehicle collisions occur. Such airbag apparatuses are classified into a driver seat airbag apparatus which protects a driver, and a passenger seat airbag apparatus which protects a passenger sitting on the passenger seat.

As shown in FIG. 8B, the passenger seat airbag apparatus includes an inflator 40 which generates gas, an airbag cushion 10 which is inflated by gas supplied from the inflator 40, a housing 50 which houses components, and an airbag door 60.

In the conventional passenger seat airbag apparatus, the airbag cushion 10 is retained in a crash pad 20 under normal conditions. When a vehicle collision occurs, the airbag door 60 is opened in the direction of the windshield by a signal to deploy transmitted from an ACU. Simultaneously, as shown in FIG. 8A, the airbag cushion 10 is deployed into a shape it has when it comes into close contact both with the upper surface of the crash pad 20 and with the windshield.

However, in the conventional passenger seat airbag apparatus having the above-mentioned construction, when the airbag door opens to deploy the airbag cushion, the airbag door strikes the windshield. Thereby, the windshield may be broken.

Furthermore, to reliably protect the passenger from impact, the airbag must have a large capacity that corresponds to the space between the crash pad and the passenger. In the case where the airbag having the large capacity is used, the entire weight of the vehicle increases, and the production cost of the airbag apparatus increases.

Moreover, the designs of the crash pad and the windshield are suited to the kind of vehicle so that they are different between different kinds of vehicles. The difference in design causes variations in the shape and structure of the airbag cushion. This makes it difficult to standardize the passenger seat airbag apparatus.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide a roof airbag apparatus for a vehicle which is configured such that even though an air tube which is deployed from a roof panel of the vehicle has a comparatively small volume, it can safely protect a passenger in the event of a vehicle collision.

In an aspect of the present invention, the roof airbag apparatus for a vehicle, may include an inflator providing gas pressure, an air tube deploying towards sides of a passenger sitting on a seat when gas may be supplied from the inflator into the air tube, and a front support panel provided on a front end of the air tube to enclose a front portion of the passenger when the air tube may be deployed.

The air tube may include a support tube fastened to a roof panel of the vehicle, the support tube being fluid-connected at a first end thereof to the inflator, a first bent tube fluid-connected to a second end of the support tube and bent in a predetermined direction such that the first bent tube may be deployed to protect a first side of the passenger, a second bent tube branching off the support tube at a position adjacent to the first end of the support tube and bending in a predetermined direction such that the second bent tube may be deployed to protect a second side of the passenger, and a connection tube fluid-connecting front ends of the first and second bent tubes to each other, wherein the first and second bent tubes may be spaced apart each other by the connecting tube with a predetermined distance to receive the passenger when the air tube may be deployed, wherein the front support panel may be connected to the roof panel of the vehicle by a tether, and wherein the tether may be in a folded and sewed state while the air tube may not be deployed.

The air tube further may include a first front bent tube and a second front bent tube, the first front bent tube being fluid-connected to the front end of the first bent tube and the second front bent tube being fluid-connected to the front end of the second bent tube.

The first front bent tube and the first bent tube form a 'U' shape in an imaginary vertical plane and open upwards and wherein the second front bent tube and the second bent tube form a 'U' shape in an imaginary vertical plane and open upwards.

The connection tube and the first and second front bent tubes may be connected together by the front support panel.

The first front bent tube and the first bent tube form a 'U' shape in an imaginary vertical plane and the first front bent tube may be connected to the support tube and wherein the second front bent tube and the second bent tube form a 'U' shape in an imaginary vertical plane and the second front bent tube may be connected to the support tube, wherein opposite ends of the connection tube may be respectively connected to first ends of the first and second bent tubes, the front support panel may be attached to an upper portion of the connection tube, and a front auxiliary cushion may be formed on the front support panel, the front auxiliary cushion fluid-communicating with the connection tube, wherein a tether may be connected between the roof panel and an upper end of the front support panel.

In another aspect of the present invention, opposite ends of the connection tube may be respectively connected to first ends of the first and second bent tubes, the front support panel may be attached to an upper portion of the connection tube, and a front auxiliary cushion may be formed on the front support panel, the front auxiliary cushion fluid-communicating with the connection tube.

The support tube may be fastened to the roof panel of the vehicle by a plurality of fastening bands, each of the fastening bands being made of fabric.

Side support panels may be respectively attached between the first bent tube and the support tube and between the second bent tube and the support tube, the side support panels covering opposite sides of the passenger.

The support tube may have a 'U' shape in an imaginary horizontal plane and opens towards a rear of the vehicle.

As described above, the present invention has the following effects.

First, an air tube which is deployed from a roof panel of the vehicle can effectively and safely protect a passenger from impact when a vehicle collision occurs.

Second, the air tube is deployed into space between a crash pad and the passenger. The air tube has a comparatively small volume. Because a small volume air tube is used, the entire weight of the vehicle is reduced, and the production cost of the air bag apparatus is reduced.

Third, the airbag apparatus of the present invention is configured such that the air tube is deployed from a headlining. Therefore, regardless of the design of the crash pad or the windshield which differs according to the kind of vehicle, the shape and structure of the airbag apparatus can be standardized.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
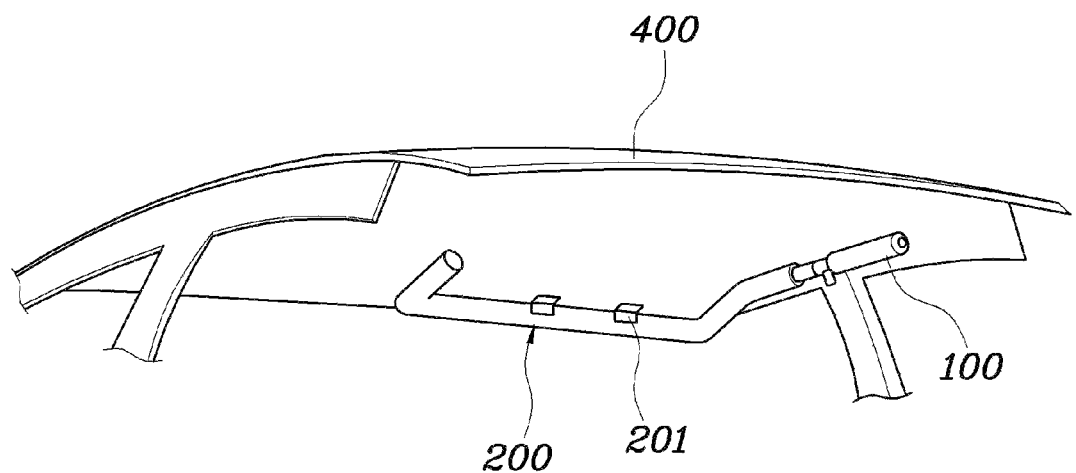
FIG. 1 is a perspective view of a roof airbag apparatus for a vehicle, according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Hereinafter, embodiments of the present invention will be described in detail with reference to the attached drawings.

As shown in FIG. 1, a roof airbag apparatus for a vehicle according to an exemplary embodiment of the present invention is configured such that an air tube 200 having a relatively small volume can effectively enclose the front and side of a passenger 500.

In detail, when a vehicle collision occurs, the air tube 200 of the roof airbag apparatus is inflated by gas supplied from the inflator 100 to form a pipe shape, thus protecting the passenger 500 from impact. The inflator 100 is installed in the space between a roof panel of a vehicle body and a headlining and functions to supply gas into an airbag cushion when a vehicle collision occurs. The structure of the inflator 100 is the same as that of inflators used in typical airbag apparatuses, therefore further explanation is deemed unnecessary.

Figure 2:
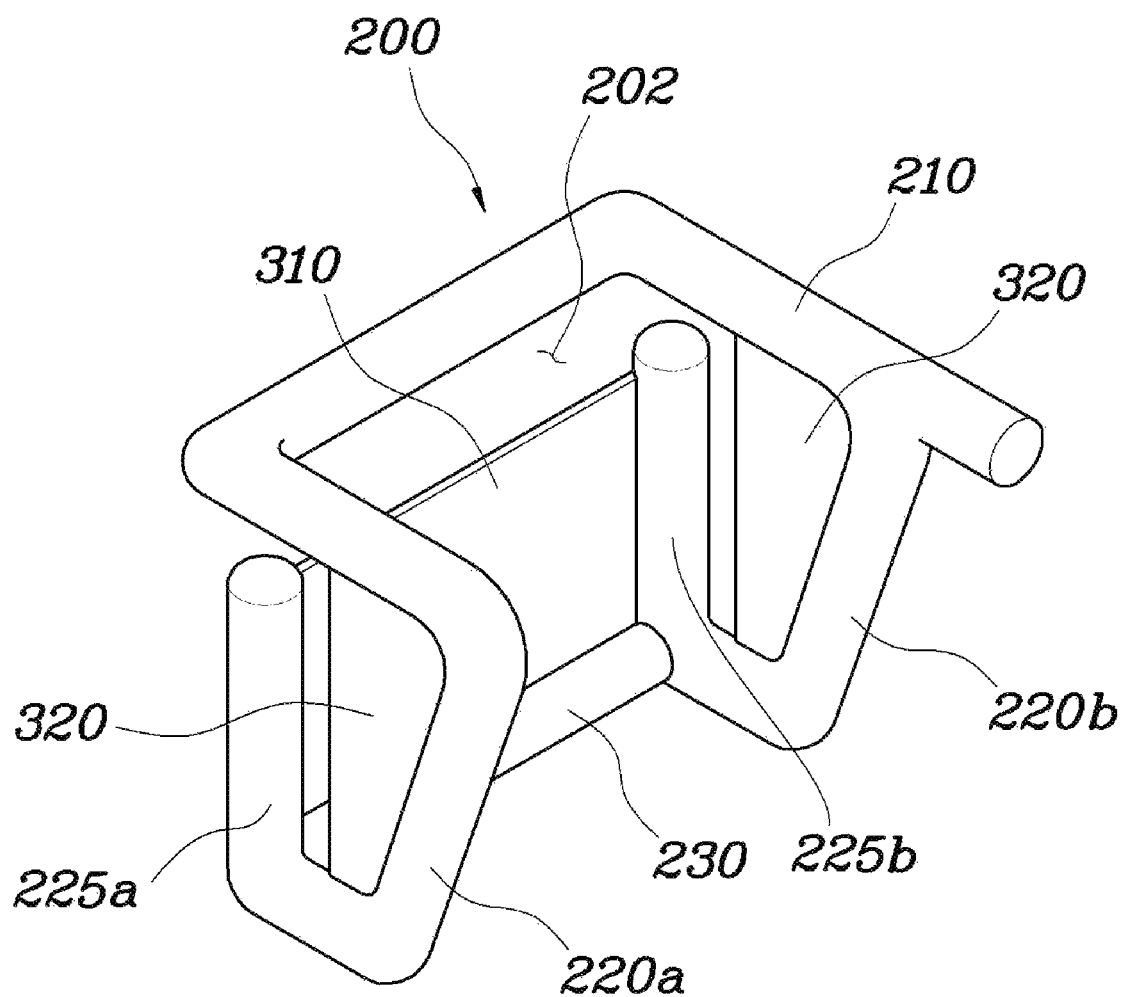
FIG. 2 is a perspective view of an air tube of a roof airbag apparatus for a vehicle, according to various exemplary embodiments of the present invention.
Figure 3:
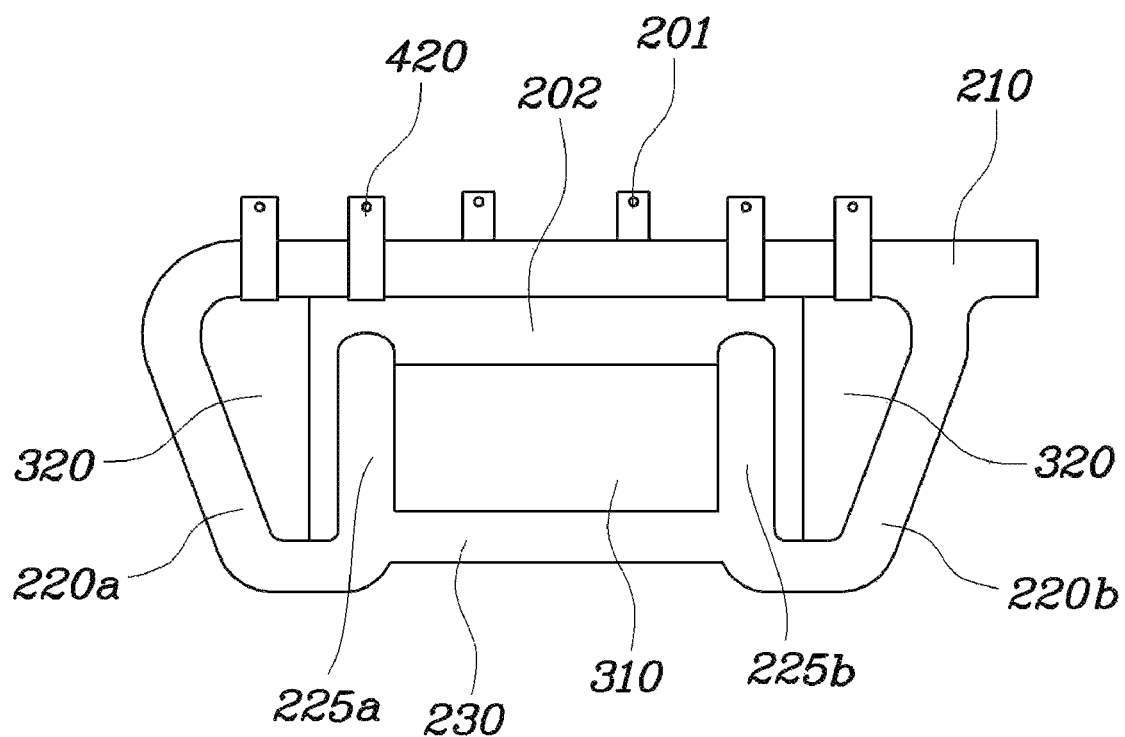
FIG. 3 is a development view of the air tube of FIG. 2.

As shown in FIGS. 2 and 3, in a roof airbag apparatus according to a first embodiment of the present invention, an air tube 200 is installed in the space defined between a roof panel 400 and a headlining and maintained in a folded state under normal conditions. When a vehicle collision occurs, the air tube 200 comes out through a tear line which is formed in the headlining and then deploys towards both sides of the passenger 500 who is sitting on a vehicle seat.

The air tube 200 includes a support tube 210, first and second bent tubes 220a and 220b, first and second front bent tubes 225a and 225b, and a connection tube 230.

The support tube 210 has a 'U' shape, the open portion of which is oriented towards the rear of the vehicle. The support tube 210 is fastened to the roof panel 400 by a plurality of fastening pieces 201. The reason for the 'U' shape of the support tube 210 is that when the air tube 200 is deployed to absorb an impact applied to the passenger 500, the 'U'-shaped support tube 210 can effectively support the entire air tube 200 with respect to the roof panel 400.

When the air tube 200 is deployed, the support tube 210 is retained in the state of being fastened to the roof panel 400 by a plurality of fastening bands 420 which hold corresponding circumferences of the support tube 210. In this embodiment, each fastening band 420 is made of fabric.

Furthermore, the support tube 210 transmits gas from the inflator 100 to the first and second bent tubes 220a and 220b. A first end of the support tube 210 is connected to the inflator 100, and a second end thereof is connected to the first bent tube 220a. The second bent tube 220b is connected to a portion of the support tube 210 adjacent to the first end thereof.

The first bent tube 220a is bent downwards from the second end of the support tube 210 such that the first bent tube 220a is deployed towards a first side portion of the passenger 500. The first bent tube 220a which is connected to the second end of the support tube 210, is further connected to the first front bent tubes 225a to form a shape. A first side support panel 320 is provided in the space defined by the first bent tube 220a and the support tube 210 and connected to the junction between the first bent tube 220a and the support tube 210. When the side support panel 320 is deployed, the first side support panel 320 retains the entire shape of the air tube 200 and protects the first side portion of the passenger 500 from a side collision.

The second bent tube 220b is bent downwards from the first end of the support tube 210 such that the second bent tube 220b is deployed towards a second side portion of the passenger 500. The second bent tube 220b is further connected to the second front bent tubes 225b to form a 'U' shape. Also a second side support panel 320 made of soft material is provided in the space defined by the second bent tube 220b and the support tube 210 and connected to the junction between the second bent tube 220b and the support tube 210. When the side support panel 320 is deployed, the second side support panel 320 retains the entire shape of the air tube 200 and protects the second side portion of the passenger 500 from a side collision.

The first front bent tube 225a is connected to the second front bent tube 225b by a front support panel 310 made of soft material. The front support panel 310 functions to protect the passenger 500 from a front collision of the vehicle. A first edge of the front support panel 310 is sewed to the front portion of the first front bent tube 225a, and a second edge thereof is sewed to the front portion of the second front bent tube 225b. A lower edge of the front support panel 310 is sewed to the connection tube 230. A space 202 is defined between the front support panel 310 and the support tube 210.

The connection tube 230 communicates the front portions of the first and second bent tubes 220a and 220b, in detail, lower ends of the front portions of the first and second bent tubes 220a and 220b, with each other. Therefore, when a vehicle collision occurs, the connection tube 230 is inflated by gas supplied from the first and second bent tubes 220a and 220b to protect the chest of the passenger 500.

Figure 4A:
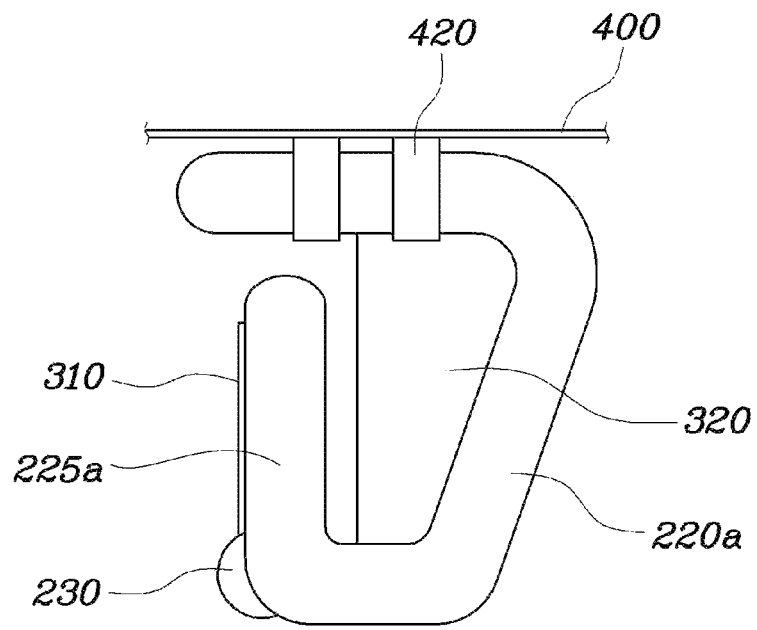
FIGS. 4A and 4B are views showing the operation of the roof airbag apparatus according to the various exemplary embodiments of the present invention.
Figure 4B:
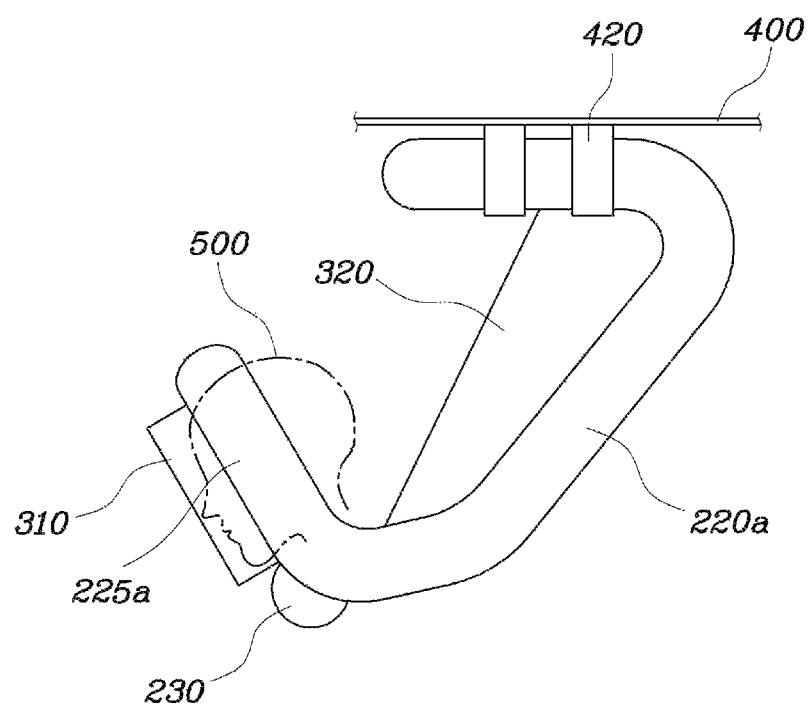

For example, when a vehicle collision occurs, the inflator 100 is operated. Then, as shown in FIGS. 4A and 4B, gas is supplied from the inflator 100 into the first and second bent tubes 220a and 220b and the first and second front bent tubes 225a and 225b through the support tube 210. When gas is supplied into the first and second bent tubes 220a and 220b and the first and second front bent tubes 225a and 225b, the first and second bent tubes 220a and 220b and the first and second front bent tubes 225a and 225b are deployed from the headlining towards the front of the passenger 500. Thereby, the front support panel 310, the side support panels 320 and the connection tube 230 are spread out to enclose the front and both sides of the passenger 500.

After the air tube 200 has been deployed, when the passenger 500 collides with the air tube 200, the front support panel 310, the side support panels 320 and the connection tube 230 covers the passenger 500 to absorb impact applied to the passenger 500. Here, since the passenger 500 has collided with the air tube 200, the first and second front bent tubes 225a and 225b are moved forwards and downwards by the passenger 500, so that the time for which the air tube 200 receives the passenger 500 is increased. Thus, the air tube 200 can effectively reduce the force of impact.

Figure 5:
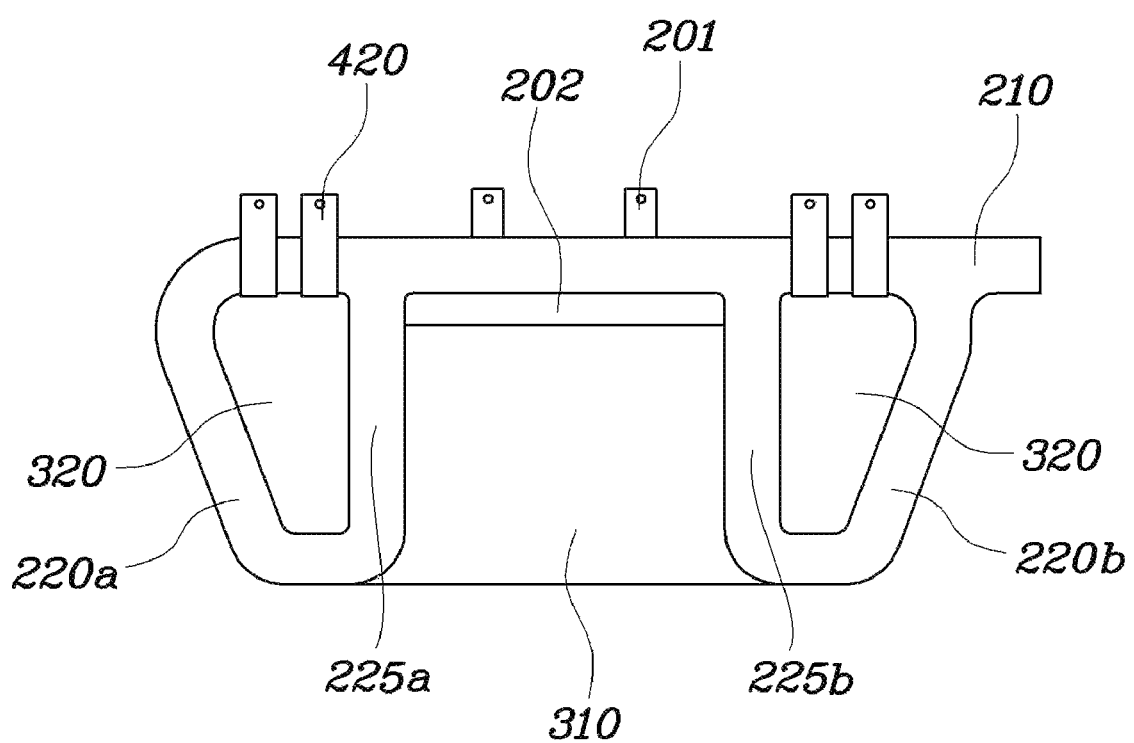
FIG. 5 is a development view of an air tube of a roof airbag apparatus for a vehicle, according to various exemplary embodiments of the present invention.

As shown in FIG. 5, in a roof airbag apparatus according to a second embodiment of the present invention, an air tube 200 includes a support tube 210 and first and second bent tubes 220a and 220b. The first and second front bent tubes 225a and 225b are connected to each other only by a front support panel 310. A side support panel 320 is provided in each of the first and second bent tubes 220a and 220b. A space 202 is defined between the front support panel 310 and the support tube 210.

When a vehicle collision occurs, gas is supplied from the inflator 100 into the first and second bent tubes 220a and 220b and the first and second front bent tubes 225a and 225b through the support tube 210. Then, the first and second bent tubes 220a and 220b and the first and second front bent tubes 225a and 225b are deployed from the headlining towards the front of the passenger 500. Thereby, the front support panel 310 and the side support panels 320 spread out to enclose the front and both sides of the passenger 500.

Figure 6:
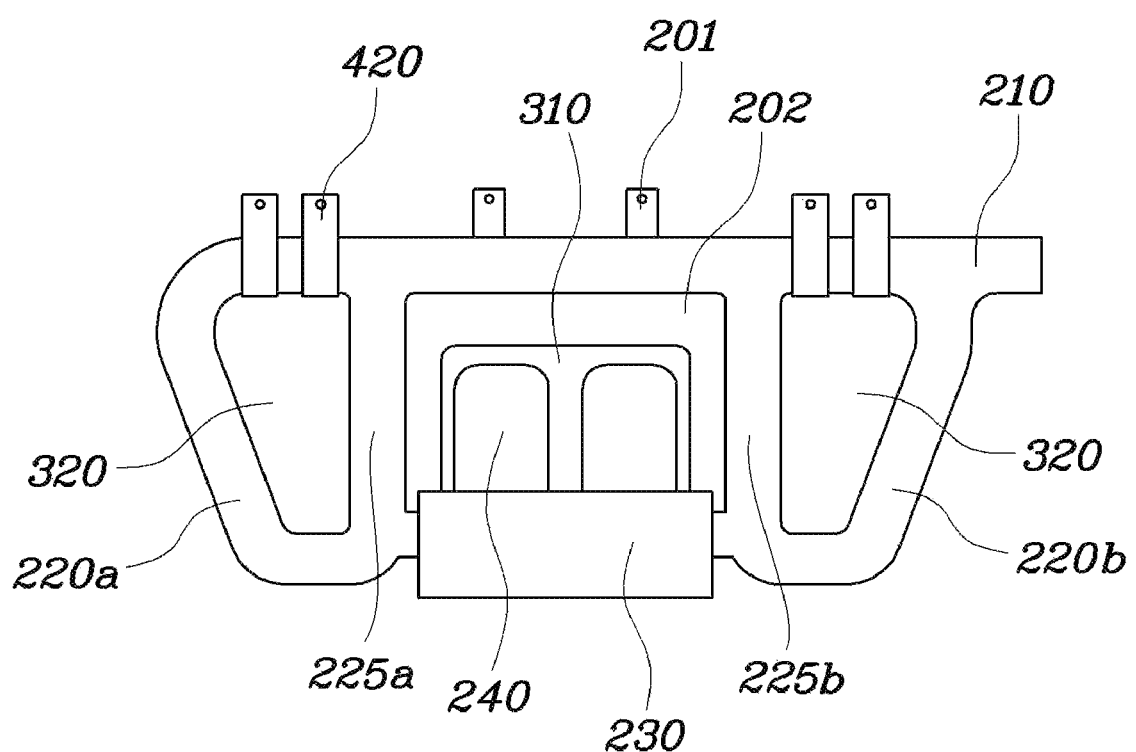
FIG. 6 is a development view of an air tube of a roof airbag apparatus for a vehicle, according to various exemplary embodiments of the present invention.

As shown in FIG. 6, in a roof airbag apparatus according to a third embodiment of the present invention, an air tube 200 includes a support tube 210, first and second bent tubes 220a and 220b, the first and second front bent tubes 225a and 225b, a connection tube 230 and a front auxiliary cushion 240. A front support panel 310 including the front auxiliary cushion 240 protrudes upwards from an upper portion of the connection tube 230. A space 202 is formed above and on opposite sides of the front support panel 310.

The front auxiliary cushion 240 is provided on the front support panel 310 and communicated with the connection tube 230 so that gas can be supplied from the connection tube 230 into the front auxiliary cushion 240. As such, because gas is supplied into the front support panel 310 through the front auxiliary cushion 240, the roof airbag apparatus of this embodiment can more safely protect the front of the passenger 500 from impact.

Figure 7:
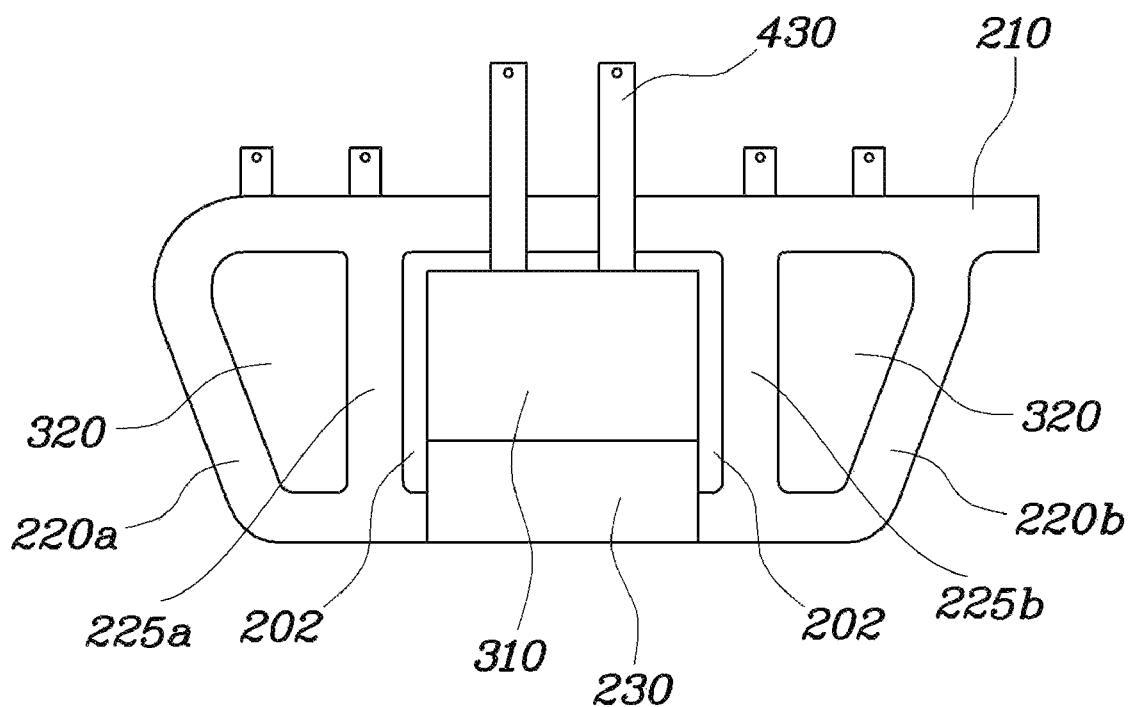
FIG. 7 is a development view of an air tube of a roof airbag apparatus for a vehicle, according to various exemplary embodiments of the present invention.
Figure 8A:
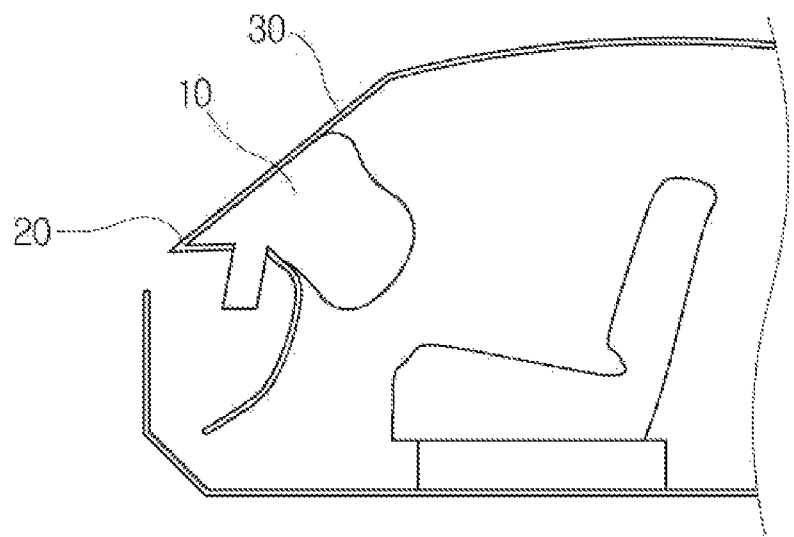
FIG. 8A is a view showing deployment of a conventional passenger seat airbag apparatus.
Figure 8B:
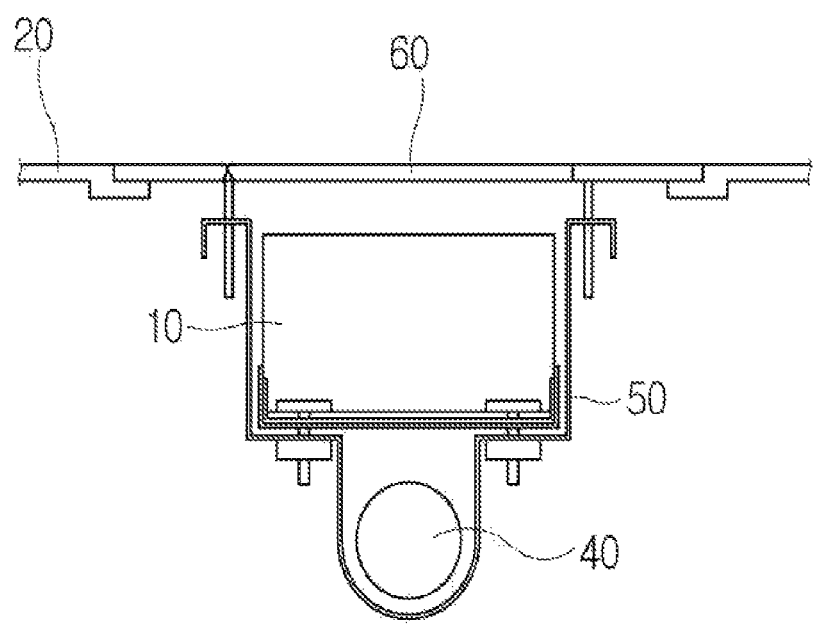
FIG. 8B is a view showing the construction of the conventional passenger seat airbag apparatus.

As shown in FIG. 7, in a roof airbag apparatus according to a fourth embodiment of the present invention, an air tube 200 includes a support tube 210, first and second bent tubes 220a and 220b, the first and second front bent tubes 225a and 225b, a connection tube 230 and a tether 430. A front support panel 310 protrudes upwards from an upper portion of the connection tube 230. A space 202 is formed above and on opposite sides of the front support panel 310.

In this embodiment, both ends of the tether 430 are respectively connected to the roof panel 400 and the upper end of the front support panel 310. Under normal conditions, the tether 430 is maintained in a sewed and folded state. When the air tube 200 is deployed, the sewed portion of the tether 430 is broken and spreads out to restrict the range over and within which the front support panel 310 is deployed.

As described above, in a roof airbag apparatus for a vehicle according to an exemplary embodiment of the present invention, an air tube 200 is deployed from a headlining and is able to effectively and safely protect a passenger 500 from impacts. The air tube 200 which embodies the airbag apparatus has a comparatively small volume, thus reducing the entire weight of the vehicle, and reducing the production cost of the airbag apparatus.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:
1. A roof airbag apparatus for a vehicle, comprising:
an inflator providing gas pressure;

an air tube deploying towards sides of a passenger sitting on a seat when gas is supplied from the inflator into the air tube; and a front support panel provided on a front end of the air tube to enclose a front portion of the passenger when the air tube is deployed;

wherein the air tube includes:

a support tube fastened to a roof panel of the vehicle, the support tube being fluid-connected at a first end thereof to the inflator;

a first bent tube fluid-connected to a second end of the support tube and bent in a predetermined direction such that the first bent tube is deployed to protect a first side of the passenger;

a second bent tube branching off the support tube at a position adjacent to the first end of the support tube and bending in a predetermined direction such that the second bent tube is deployed to protect a second side of the passenger; and a connection tube fluid-connecting front ends of the first and second bent tubes to each other, and wherein the first and second bent tubes are spaced apart each other by the connecting tube with a predetermined distance to receive the passenger when the air tube is deployed.

2. The roof airbag apparatus as set forth in claim 1, wherein the front support panel is connected to the roof panel of the vehicle by a tether.

3. The roof airbag apparatus as set forth in claim 2, wherein the tether is in a folded and sewed state while the air tube is not deployed.

4. The roof airbag apparatus as set forth in claim 1, wherein the air tube further includes a first front bent tube and a second front bent tube, the first front bent tube being fluid-connected to the front end of the first bent tube and the second front bent tube being fluid-connected to the front end of the second bent tube.

5. The roof airbag apparatus as set forth in claim 4, wherein the first front bent tube and the first bent tube form a 'U' shape in an imaginary vertical plane and open upwards and wherein the second front bent tube and the second bent tube form a 'U' shape in an imaginary vertical plane and open upwards.

6. The roof airbag apparatus as set forth in claim 5, wherein the connection tube and the first and second front bent tubes are connected together by the front support panel.

7. The roof airbag apparatus as set forth in claim 4, wherein the first front bent tube and the first bent tube form a 'U' shape in an imaginary vertical plane and the first front bent tube is connected to the support tube and wherein the second front bent tube and the second bent tube form a 'U' shape in an imaginary vertical plane and the second front bent tube is connected to the support tube.

8. The roof airbag apparatus as set forth in claim 7, wherein opposite ends of the connection tube are respectively connected to first ends of the first and second bent tubes, the front support panel is attached to an upper portion of the connection tube, and a front auxiliary cushion is formed on the front support panel, the front auxiliary cushion fluid-communicating with the connection tube.

9. The roof airbag apparatus as set forth in claim 8, wherein a tether is connected between the roof panel and an upper end of the front support panel.

10. The roof airbag apparatus as set forth in claim 1, wherein opposite ends of the connection tube are respectively connected to first ends of the first and second bent tubes, the front support panel is attached to an upper portion of the connection tube, and a front auxiliary cushion is formed on the front support panel, the front auxiliary cushion fluid-communicating with the connection tube.

11. The roof airbag apparatus as set forth in claim 1, wherein the support tube is fastened to the roof panel of the vehicle by a plurality of fastening bands, each of the fastening bands being made of fabric.

12. The roof airbag apparatus as set forth in claim 1, wherein side support panels are respectively attached between the first bent tube and the support tube and between the second bent tube and the support tube, the side support panels covering opposite sides of the passenger.

13. The roof airbag apparatus as set forth in claim 1, wherein the support tube has a 'U' shape in an imaginary horizontal plane and opens towards a rear of the vehicle.

* * * * *